US007890538B2

(12) United States Patent
Roden

(10) Patent No.: US 7,890,538 B2
(45) Date of Patent: Feb. 15, 2011

(54) SYSTEM AND METHOD FOR CONVERTING AND STORING DATA VALUES

(75) Inventor: Bari Jane Roden, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/117,821

(22) Filed: May 9, 2008

(65) Prior Publication Data

US 2009/0282073 A1   Nov. 12, 2009

(51) Int. Cl.
G06F 17/30 (2006.01)
(52) U.S. Cl. .................. 707/793; 707/803; 707/809
(58) Field of Classification Search .................. 707/793
See application file for complete search history.

(56) References Cited

U.S. PATENT DOCUMENTS

| | | | |
|---|---|---|---|
| 5,761,408 A | | 6/1998 | Kolawa et al. |
| 5,784,553 A | | 7/1998 | Kolawa et al. |
| 6,192,108 B1 | | 2/2001 | Mumford et al. |
| 6,233,573 B1 | | 5/2001 | Bair et al. |
| 6,301,701 B1 | | 10/2001 | Walker et al. |
| 6,701,308 B1 | | 3/2004 | Chen et al. |
| 6,769,114 B2 | | 7/2004 | Leung |
| 6,904,430 B1 | | 6/2005 | Livshits |
| 6,954,759 B2 | | 10/2005 | Yamaguchi |
| 7,062,502 B1 * | | 6/2006 | Kesler .............................. 1/1 |
| 7,383,273 B2 * | | 6/2008 | Wang et al. .................. 707/809 |
| 7,409,387 B2 * | | 8/2008 | Dietel .............................. 1/1 |
| 7,603,660 B2 | | 10/2009 | Davia et al. |
| 7,702,686 B2 * | | 4/2010 | Meijer et al. ................. 707/763 |
| 7,783,587 B1 * | | 8/2010 | Long et al. .................... 706/46 |
| 2003/0018932 A1 | | 1/2003 | Blum et al. |
| 2003/0172368 A1 * | | 9/2003 | Alumbaugh et al. ........ 717/106 |
| 2004/0107205 A1 | | 6/2004 | Burdick et al. |
| 2006/0026199 A1 * | | 2/2006 | Crea ....................... 707/103 R |
| 2008/0307263 A1 | | 12/2008 | Coulter, Jr. et al. |
| 2010/0094864 A1 * | | 4/2010 | Foody ........................ 707/722 |

OTHER PUBLICATIONS

Korel et al., "Automated Regression Test Generation," ISSTA 98, Clearwater Beach FL USA, pp. 143-152.
Rothermel et al., "A Safe, Efficient Regression Test Selection Technique," ACM Transactions on Software Engineering and Methodology, vol. 6, No. 2, Apr. 1997, pp. 173-210.
Rothermel et al., "Selecting Regression Tests for Object-Oriented Software," IEEE 1994, pp. 14-25.
Notice of Allowance (Mail Date Sep. 29, 2010) for U.S. Appl. No. 12/117,782, filed May 9, 2008.

* cited by examiner

*Primary Examiner*—Kuen S Lu
*Assistant Examiner*—Binh V Ho
(74) *Attorney, Agent, or Firm*—Schmeiser, Olsen & Watts; John R. Pivnichny

(57) ABSTRACT

A system and associated method for converting and storing data values. Receiving multiple primary keys, each primary key being associated with a unique table in a plurality of tables; multiple foreign keys, each foreign key being associated with at least two tables in the plurality of tables; and multiple datasets; each dataset containing a schema for a single table. Creating a schema control card identifying the primary keys, foreign keys, datasets' location, and identifies a path to traverse the tables. Creating either a storage control to store data values from the plurality of tables to a storage location, or creating a retrieval control card to retrieve a storage value from the storage location and return to the plurality of tables. The tables are traversed via the path and data values are either stored using the storage control card or retrieved using the retrieval control card.

20 Claims, 5 Drawing Sheets

```
                                    Dataset
                                      300
                       ┌─────────────────────────────────┐
Table name  ⎧ ┌─────────────────────────────────────────────┐
   302      ⎩ │ Customer                                    │
              ├─────────────────────────────────────────────┤
              │ Name          character    20    1    N     │
              │ CMR           decimal       9    2    N     │
              │ Invoice Date  decimal       8    3    N     │
              └─────────────────────────────────────────────┘
                    ⎵             ⎵           ⎵      ⎵      ⎵
               Field names   Data types  Data lengths Column Null values
                  304           306          308      310      312
```

FIG. 3

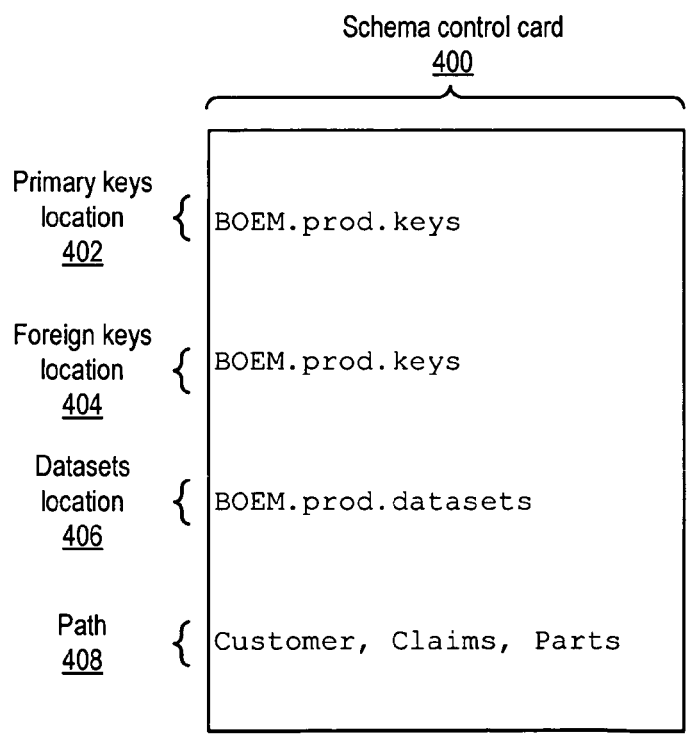

FIG. 4

SYSTEM AND METHOD FOR CONVERTING AND STORING DATA VALUES

FIELD OF THE INVENTION

The present invention discloses a system and associated method for converting and storing data values to and from a plurality of tables.

BACKGROUND OF THE INVENTION

Conventional regression testing requires the creation of sample test data for each release of a complex application. The nature of complex applications requires a multitude of sample input and output data. Individual programs must be written to store and retrieve sample input and output data when a complex application progresses from one release to the next. As the complex application progresses through the software development lifecycle, rewriting programs to store and retrieve sample data becomes cumbersome.

Thus, there is a need for a system and associated method that overcomes at least one of the preceding disadvantages of current methods for converting and storing data values.

SUMMARY OF THE INVENTION

A method for converting and storing data values comprising:

receiving a plurality of primary keys and a plurality of foreign keys, each primary key in said plurality of primary keys being associated with a unique table of a plurality of tables, each foreign key in said plurality of foreign keys being associated at least two tables of said plurality of tables, each table in said plurality of tables being relationally related to at least one other table in said plurality of tables, wherein each table in said plurality of tables contains a first plurality of data values;

receiving a plurality of datasets, each dataset in said plurality of datasets comprising a collection of schema for a unique table of said plurality of tables;

after said receiving said plurality of primary keys and said plurality of foreign keys, after said receiving a plurality of datasets, creating a schema control card, said schema control card comprising a list that includes said plurality of primary keys, said plurality of foreign keys, a location for said plurality of datasets, and a list comprising a path to traverse said plurality of tables;

after said creating said schema control card, creating a storage control card or creating a retrieval control card, said storage control card comprising: a list that includes a location for said schema control card; a data value located in at least one table of said plurality of tables, a storage location; a first storage value data type; and a boolean value identifying whether said first storage value replaces a previously stored first storage value located in said storage location, said retrieval control card comprising: a list that includes said location for said schema control card; said storage location; and a row number of a row of said plurality of rows, and after said creating said storage control card or said creating said retrieval control card, traversing said plurality of tables utilizing said storage control card or traversing said plurality of table utilizing said retrieval control card, respectively.

The present invention provides a system and method that overcomes at least one of the current disadvantages of conventional methods.

BRIEF DESCRIPTION OF THE DRAWINGS

FIG. 3 illustrates a dataset, in accordance with the embodiments of the present invention.

FIG. 4 illustrates a schema control card, in accordance with the embodiments of the present invention.

DETAILED DESCRIPTION OF THE DRAWINGS

Figure 1:
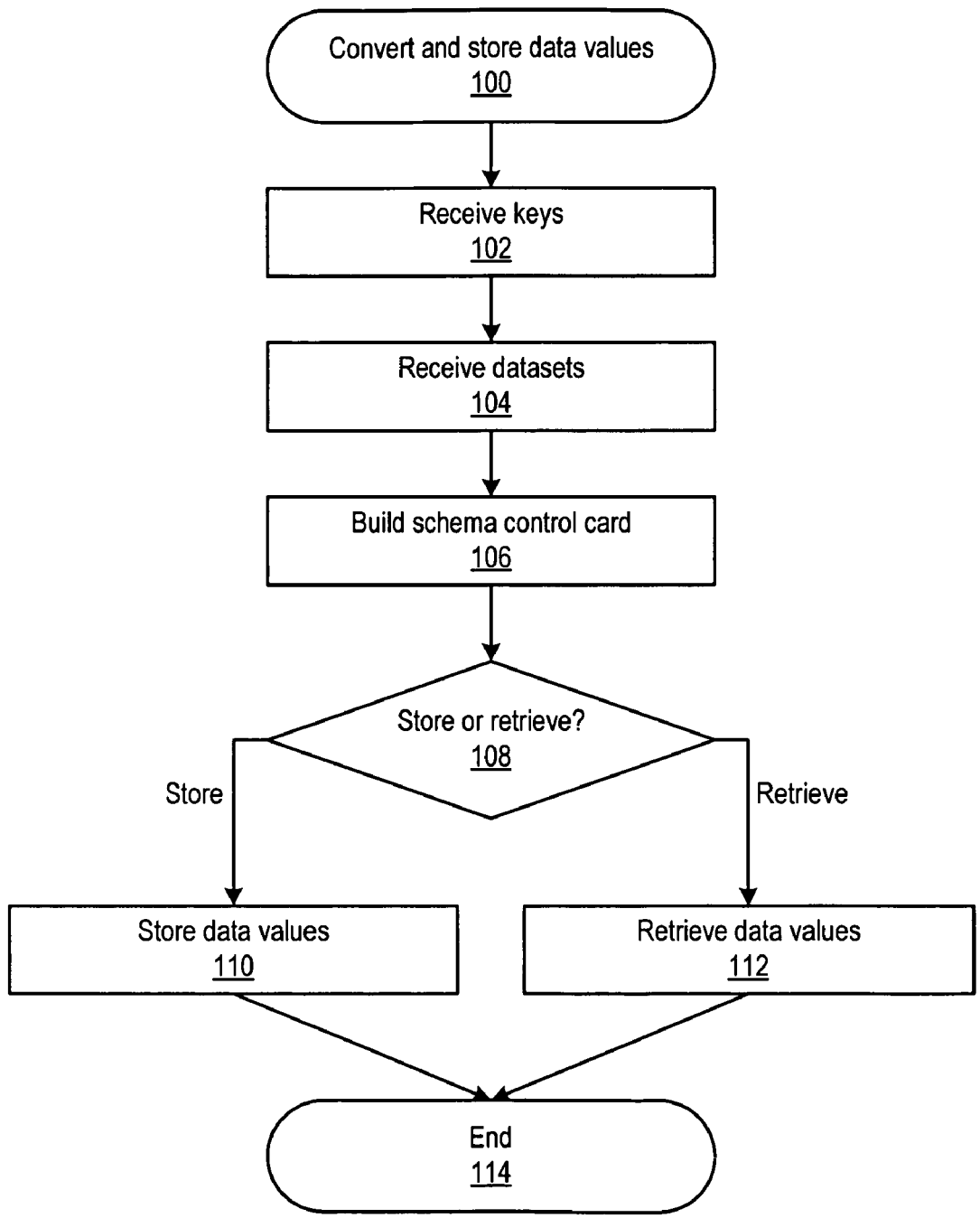
FIG. 1 illustrates a method for converting and storing data values, in accordance with the embodiments of the present invention.

FIG. 1 illustrates a method for converting and storing data values 100, in accordance with the embodiments of the present invention. The method 100 of converting and storing data values begins with step 102 which receives a plurality of primary keys and a plurality of foreign keys.

Figure 2:
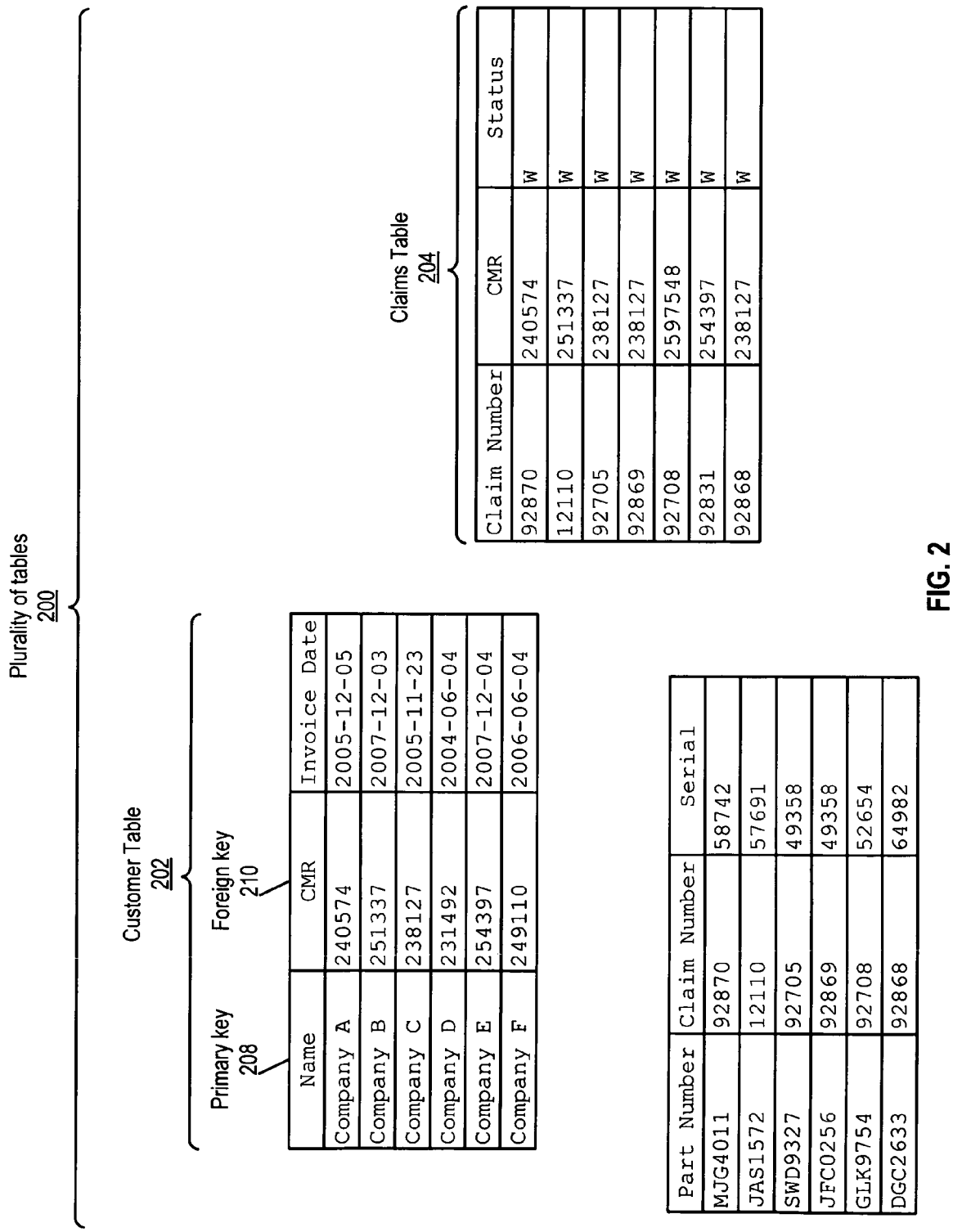
FIG. 2 illustrates a plurality of tables, in accordance with the embodiments of the present invention.

Step 102 receives a plurality of primary keys and a plurality of foreign keys. Each primary key 208 in the plurality of primary keys is associated with a unique table in a plurality of tables 200 (see FIG. 2, infra). The number of primary keys received correlates to the number of tables in the plurality of tables 200. Each table in the plurality of tables 200 comprises a plurality of rows and a plurality of columns, each row and column therein containing data values. The plurality of tables may be, inter alia, database tables, flat files, or emails having a specified structure. Each primary key 208 identifies one column in the associated table 202 wherein every data value in the column is unique. Each primary key 208 facilitates searching a table 202 for a row of data values based on known data value located in the column for which the primary key 208 refers.

Each foreign key 210 in the plurality of foreign keys is associated with at least two tables in the plurality of tables 200. The number of foreign keys received correlates to the number of tables in the plurality of tables 200. Each foreign key 210 identifies one column present in at least two tables (see CMR column in Customer Table 202 and CMR column in Claims Table 204 in FIG. 2, infra), the data values contained in the columns being identical. A foreign key 210 facilitates correlating at least two different rows residing in different tables, each row containing a matching data value, the data value being located in the column for which the foreign key 210 refers. An example of a plurality of tables 200, a primary key 208, and a foreign key 210 is made with respect to FIG. 2, infra. After completion of step 102, the method 100 continues with step 104 which receives a plurality of datasets.

Step 104 receives a plurality of datasets. The number of datasets received correlates to the number of tables in the plurality of tables. Each dataset 300 (see FIG. 3, infra) in the plurality of datasets contains a list comprising the name of the table 302 for which the dataset 300 corresponds, a list of field names 304 present in the table, a list of data types 306 wherein each data type corresponds to a unique field name in the list of field names 304. Each dataset 300 further comprises a list of data lengths 308, wherein each data length corresponds to a unique field name in the list of field names 304. In one embodiment of the present invention, each dataset 300 further comprises a list of column numbers 310, each column number corresponding to a unique field name in the list of field name 304, as well as a list of null values 312 wherein each null value corresponds to a unique field name in the list of field name 304. An example of a dataset 300 is made with respect to FIG. 3, infra. After completion of step 104, the method 100 continues with step 106 which builds a schema control card.

Step 106 builds a schema control card 400 (see FIG. 4, infra). The schema control card 400 contains a list comprising the location 402 of the plurality of primary keys, the location 404 of the plurality of foreign keys, the location 406 of the plurality of datasets, and a path 408. The path 408 identifies the order in which each table in the plurality of tables will be traversed. An example of a schema control card 400 is made with respect to FIG. 4, infra. After completion of step 106, the method 100 continues with step 108 which determines whether to store data values 110 or retrieve data values 112.

Step 108 determines whether to store data values 110 or retrieve data values 112. Depending on the requirements of an application expert, the method 100 may either store data values 110 or retrieve data values 112. If the application expert determines to store data values 110, the method 100 continues with step 110 which stores the data values. However, if the application expert determines to retrieve data values 112, the method 100 continues with step 112 which retrieves the data values.

Figure 5:
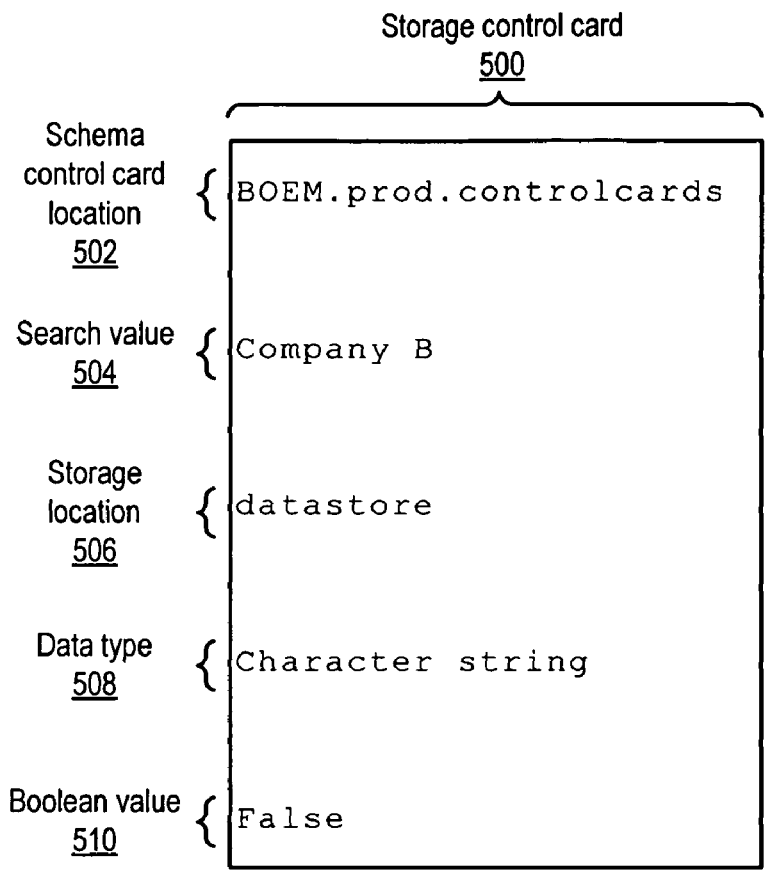
FIG. 5 illustrates a storage control card, in accordance with the embodiments of the present invention.
Figure 7:
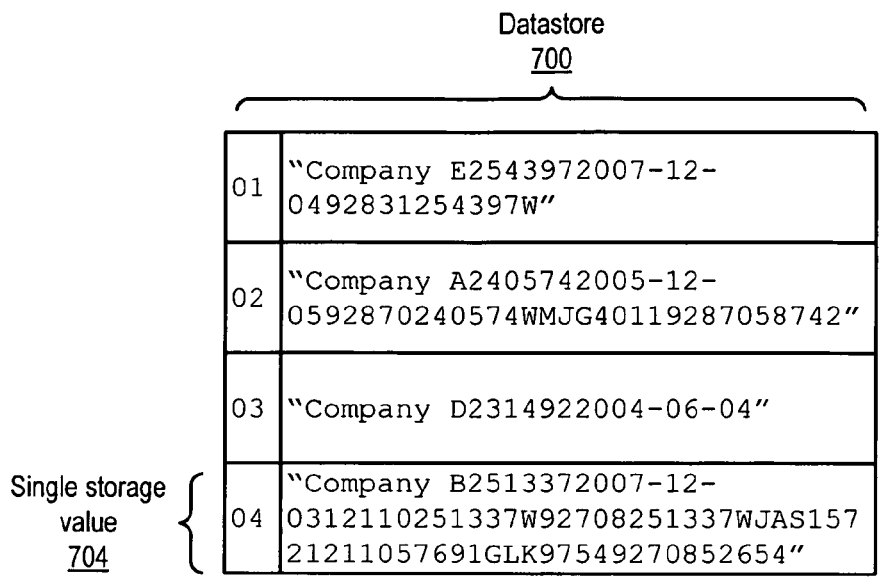
FIG. 7 illustrates a datastore, in accordance with the embodiments of the present invention.

Step 110 converts a plurality data values from the plurality of tables 200 to a single storage value and stores the single storage value 704 in a storage location 506 (see FIG. 5, infra, see FIG. 7, infra). When step 110 initiates, a storage control card 500 is created. The storage control card contains a list comprising the location 502 of the schema control card 400, a search value 504, a storage location 506, a data type 508, and a boolean value 510. The search value 504 identified in the storage control card 500 correlates to a data value located in the first table listed in the path 408, the path identified in the schema control card 400. Furthermore, the search value 504 must reside in the column of the first table for which the primary key refers. The search value 504 detailed in FIG. 5, "Company B" correlates to a data value located in the Customer Table 202 in FIG. 2, infra. Furthermore, "Company B" resides in the Name column, the column in which the primary key 208 refers. The storage location 506 identifies a location where the single storage value will be stored. The storage location 506 detailed in FIG. 5, "datastore" identifies the datastore 700 (see FIG. 7, infra). The data type 508 identifies a format which the single storage value will be converted into. The data type 508 in FIG. 5 identifies that the single storage value will be converted into a string. The boolean value 510 identifies whether the single storage value is a new entry in the datastore 700, or if the single storage value overwrites a previously stored single storage value. The boolean value 510 in FIG. 5 is false, therefore the single storage value will be stored as a new entry in the datastore 700.

After the storage control card 506 is created, step 110 traverses the plurality of tables 200 according to the path 408 utilizing the storage control card 500 and schema control card 400. At the first table in the path 408 (Customer Table 202 in FIG. 2, infra, according to the path 408 in FIG. 4, infra) the search value 504 (search value 504 being "Company B" according to FIG. 5, infra) is searched for in the column of the first table for which the primary key refers (Primary key 208 according to FIG. 2, infra). All data values correlated with the search value 504 (e.g. the row in which the search value 504 resides) are converted into the single storage value, the single storage value being in the format data type 508 prescribes (single storage value is a string data type according to data type 508 in FIG. 5, infra). A data value residing in both the column which the first table's foreign key refers and the row which correlates to the search value 504 (the data value being 251337, located in column CMR in Customer Table 202 in FIG. 2, infra) is then used to identify additional data values residing in the second table in the path 408 (rows in Claims Table 204 which contain data value 251337, see FIG. 2, infra). The additional data values are converted to the data type specified in data type 508 and appended to the single storage value. This process continues until every table identified in the path 408 is traversed. After traversal of the path 408 is complete, the single storage value 704 is stored in the storage location 506 as identified in the storage control card 500 (see single storage value 704 located in the datastore 700 in FIG. 7, infra). After completion of step 110, the method 100 ends 114.

Figure 6:
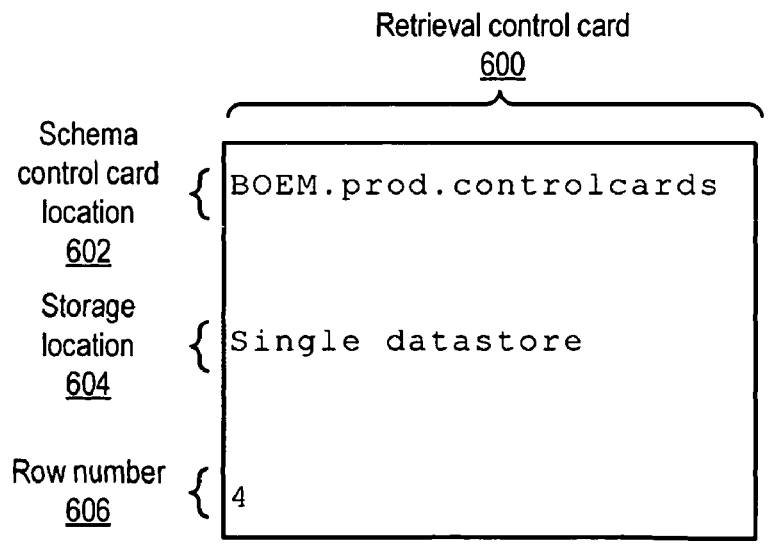
FIG. 6 illustrates a retrieval control card, in accordance with the embodiments of the present invention.

Step 112 converts a single storage value 704 in the location identified in the storage location 506 from the data type identified in data type 508 to a plurality of data values and stores the plurality of data values in the plurality of tables 200. When step 112 initiates, a retrieval control card 600 is created (see FIG. 6, infra). The retrieval control card 600 contains a list comprising a location 602 of the schema control card 400, a storage location 604, and a row number 606. The row number 606 refers to a row in the storage location 604, in FIG. 6, infra, the row number 606 identifies row 4 in the datastore 700, which will be retrieved (see FIG. 7, infra).

After the retrieval control card 600 is created, step 112 traverses the plurality of tables 200 according to the path 408 utilizing the schema control card 400 and the retrieval control card 600. At the first table identified in the path 408 (Customer Table 202 according to the example path 408 in FIG. 4, infra), the dataset 300 for the first table is retrieved. Using the dataset 300, a segment is removed from the single storage value 704, the segment having a length equal to the first data length in the list of data lengths 308 contained in the dataset 300 (see FIG. 3, infra). The segment is converted from the data type 508 into the first data type identified in the list of data types 306 contained in the dataset 300. Finally, the segment is stored in the first table in the field which correlates to the first data type and first data length. This process is repeated, respectfully, for each data length in the list of data lengths 308 contained in the dataset 300. The process of removing segments from the single storage value 704 for each data length identified in a given dataset is repeated, respectfully, for each table in the path 408. In an alternative embodiment of the present invention, the method 100 can determine if more than one row of data values for a given table are present in the single storage value 704. After completion of step 112, the method 100 ends 114.

Figure 8:
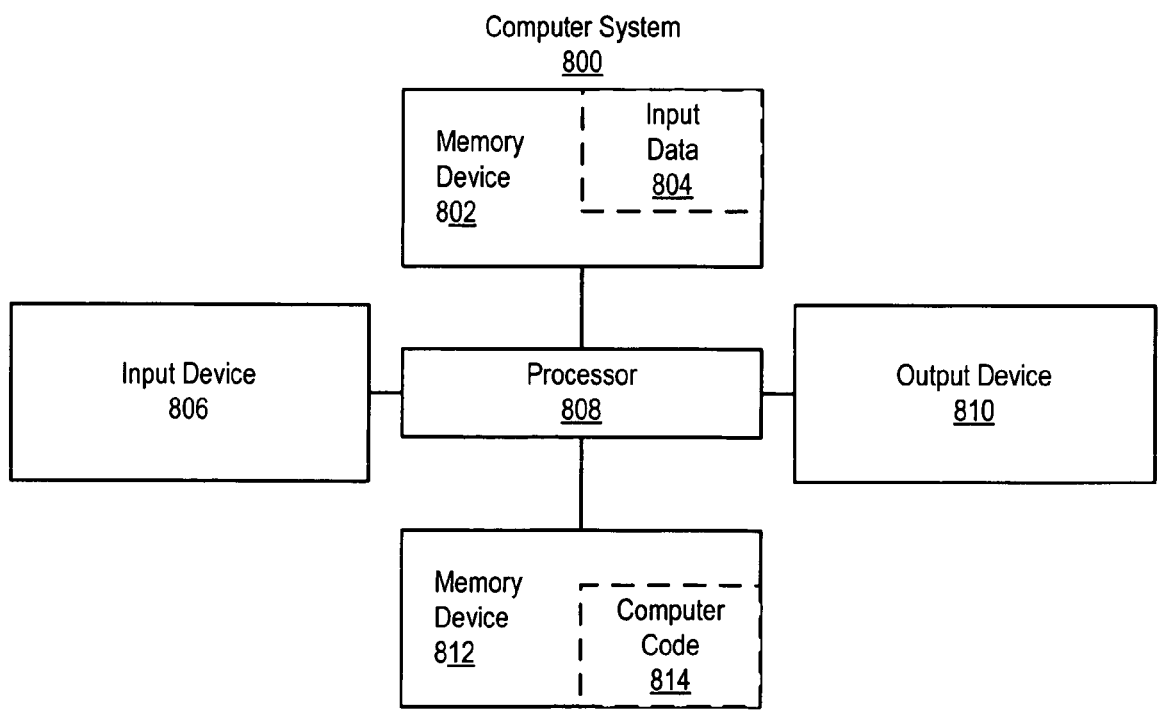
FIG. 8 illustrates a computer system used for converting and storing data values, in accordance with the embodiments of the present invention.

FIG. 8 illustrates a computer system used for converting and storing data values, in accordance with the embodiments of the preset invention.

The computer system 800 comprises a processor 808, an input device 806 coupled to the processor 808, an output device 810 coupled to the processor 808, and memory devices 802 and 812 each coupled to the processor 808. The input device 806 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 810 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 802 and 812 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 812 includes a computer code 814 which is a computer program that comprises computer-executable instructions. The computer code 814 includes, inter alia, an algorithm used for converting and storing data values according to the present invention. The processor 808 executes the computer code 814. The memory device 802 includes input data 804. The input data 804 includes input required by the computer code 814. The output device 810 displays output from the computer code 814. Either or both memory devices 802 and 812 (or one or more additional memory devices not shown in FIG. 8) may be used as a computer usable medium (or a computer readable medium or a program storage device) having a computer readable program embodied therein and/or having other data stored therein, wherein the computer readable program comprises the computer code 814. Generally, a computer program product (or, alternatively, an article of manufacture) of the computer system 800 may comprise the computer usable medium (or the program storage device).

Any of the components of the present invention can be deployed, managed, serviced, etc. by a service provider that offers to deploy or integrate computing infrastructure with respect to a process for converting and storing data values of the present invention. Thus, the present invention discloses a process for supporting computer infrastructure, comprising integrating, hosting, maintaining and deploying computer-readable code into a computing system (e.g., computing system 800), wherein the code in combination with the computing system is capable of performing a method for converting and storing data values.

In another embodiment, the invention provides a business method that performs the process steps of the invention on a subscription, advertising and/or fee basis. That is, a service provider, such as a Solution Integrator, can offer to create, maintain, support, etc. a process for converting and storing data values of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 8 shows the computer system 800 as a particular configuration of hardware and software, any configuration of hardware and software, as would be known to a person of ordinary skill in the art, may be utilized for the purposes stated supra in conjunction with the particular computer system 800 of FIG. 8. For example, the memory devices 802 and 812 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for converting and storing data values comprising:
    receiving a plurality of primary keys and a plurality of foreign keys, each primary key in said plurality of primary keys being associated with a unique table of a plurality of tables, each foreign key in said plurality of foreign keys being associated at least two tables of said plurality of tables, each table in said plurality of tables being relationally related to at least one other table in said plurality of tables, wherein each table in said plurality of tables contains a first plurality of data values;
    receiving a plurality of datasets, each dataset in said plurality of datasets comprising a collection of schema for a unique table of said plurality of tables;
    after said receiving said plurality of primary keys and said plurality of foreign keys, after said receiving a plurality of datasets, creating a schema control card, said schema control card comprising a list that includes said plurality of primary keys, said plurality of foreign keys, a location for said plurality of datasets, and a list comprising a path to traverse said plurality of tables;
    after said creating said schema control card, creating a storage control card or creating a retrieval control card, said storage control card comprising:
        a list that includes a location for said schema control card;
        a data value located in at least one table of said plurality of tables, a storage location;
        a first storage value data type; and
        a boolean value identifying whether said first storage value replaces a previously stored first storage value located in said storage location, said retrieval control card comprising:
        a list that includes said location for said schema control card;
        said storage location; and
        a row number of a row of said plurality of rows, and
    after said creating said storage control card or said creating said retrieval control card, traversing said plurality of tables utilizing said storage control card or traversing said plurality of table utilizing said retrieval control card, respectively;
    said traversing said plurality of tables utilizing said retrieval control card comprising:
        converting and restoring a unique storage value located at said row having said row number in said storage location utilizing said schema control card and said retrieval control card, said converting and said restoring comprising:
            utilizing said plurality of primary keys, said plurality of foreign keys, and said plurality of datasets to traverse said plurality of tables according to said path;
            for each table field in each table of said plurality of tables, removing a second storage value from a beginning of said first storage value, said second storage value having a length equal to said data length associated with said table field, converting said second storage value from said first storage value data type to said data type associated with said table field, and storing said second storage value in each table.

2. The method of claim 1, each dataset in said plurality of datasets being a unique list comprising a table name, a list of table fields, a list of data types, and a list of data lengths, each data type in said list of data types being associated with a unique table field in said plurality of table fields, each data length being associated with a unique table field in said plurality of table fields.

3. The method of claim 1, said first storage value data type being a string.

4. The method of claim 1, said storage location being a database table consisting of a plurality of rows and a plurality of columns residing in a relational database environment.

5. The method of claim 1, said traversing said plurality of tables utilizing said storage control card comprising:
converting and storing a second plurality of data values utilizing both said schema control card and said storage control card, said second plurality of data values being a subset of said first plurality of data values, said converting and said storing comprising: utilizing said plurality of primary keys, said plurality of foreign keys, and said plurality of datasets to traverse said plurality of tables according to said path; converting each data value relationally related to said data value into said first storage value; and storing said first storage value in said storage location according to said boolean value.

6. A computer program product, comprising a computer readable storage device having a computer-readable program code stored therein, said computer-readable program code containing instructions that when executed by a processor of a computer system implement a method for converting and storing data values comprising:
receiving a plurality of primary keys and a plurality of foreign keys, each primary key in said plurality of primary keys being associated with a unique table of a plurality of tables, each foreign key in said plurality of foreign keys being associated at least two tables of said plurality of tables, each table in said plurality of tables being relationally related to at least one other table in said plurality of tables, wherein each table in said plurality of tables contains a first plurality of data values;
receiving a plurality of datasets, each dataset in said plurality of datasets comprising a collection of schema for a unique table of said plurality of tables;
after said receiving said plurality of primary keys and said plurality of foreign keys, after said receiving a plurality of datasets, creating a schema control card, said schema control card comprising a list that includes said plurality of primary keys, said plurality of foreign keys, a location for said plurality of datasets, and a list comprising a path to traverse said plurality of tables;
after said creating said schema control card, creating a storage control card or creating a retrieval control card, said storage control card comprising:
a list that includes a location for said schema control card;
a data value located in at least one table of said plurality of tables, a storage location;
a first storage value data type; and
a boolean value identifying whether said first storage value replaces a previously stored first storage value located in said storage location, said retrieval control card comprising:
a list that includes said location for said schema control card; said
storage location; and
a row number of a row of said plurality of rows, and
after said creating said storage control card or said creating said retrieval control card, traversing said plurality of tables utilizing said storage control card or traversing said plurality of table utilizing said retrieval control card, respectively;
said traversing said plurality of tables utilizing said retrieval control card comprising:
converting and restoring a unique storage value located at said row having said row number in said storage location utilizing said schema control card and said retrieval control card, said converting and said restoring comprising:
utilizing said plurality of primary keys, said plurality of foreign keys, and said plurality of datasets to traverse said plurality of tables according to said path;
for each table field in each table of said plurality of tables, removing a second storage value from a beginning of said first storage value, said second storage value having a length equal to said data length associated with said table field, converting said second storage value from said first storage value data type to said data type associated with said table field, and storing said second storage value in each table.

7. The computer program product of claim 6, each dataset in said plurality of datasets being a unique list comprising a table name, a list of table fields, a list of data types, and a list of data lengths, each data type in said list of data types being associated with a unique table field in said plurality of table fields, each data length being associated with a unique table field in said plurality of table fields.

8. The computer program product of claim 6, said first storage value data type being a string.

9. The computer program product of claim 6, said storage location being a database table consisting of a plurality of rows and a plurality of columns residing in a relational database environment.

10. The computer program product of claim 6, said traversing said plurality of tables utilizing said storage control card comprising:
converting and storing a second plurality of data values utilizing both said schema control card and said storage control card, said second plurality of data values being a subset of said first plurality of data values, said converting and said storing comprising: utilizing said plurality of primary keys, said plurality of foreign keys, and said plurality of datasets to traverse said plurality of tables according to said path; converting each data value relationally related to said data value into said first storage value; and storing said first storage value in said storage location according to said boolean value.

11. A computing system comprising a processor coupled to a computer-readable memory unit, said memory unit comprising a software application, said software application comprising instruction that when executed by said processor, implement a method for converting and storing data values comprising:
receiving a plurality of primary keys and a plurality of foreign keys, each primary key in said plurality of primary keys being associated with a unique table of a plurality of tables, each foreign key in said plurality of foreign keys being associated at least two tables of said plurality of tables, each table in said plurality of tables being relationally related to at least one other table in said plurality of tables, wherein each table in said plurality of tables contains a first plurality of data values;
receiving a plurality of datasets, each dataset in said plurality of datasets comprising a collection of schema for a unique table of said plurality of tables;
after said receiving said plurality of primary keys and said plurality of foreign keys, after said receiving a plurality of datasets, creating a schema control card, said schema control card comprising a list that includes said plurality of primary keys, said plurality of foreign keys, a location for said plurality of datasets, and a list comprising a path to traverse said plurality of tables;

after said creating said schema control card, creating a storage control card or creating a retrieval control card, said storage control card comprising:
- a list that includes a location for said schema control card;
- a data value located in at least one table of said plurality of tables, a storage location;
- a first storage value data type; and
- a boolean value identifying whether said first storage value replaces a previously stored first storage value located in said storage location, said retrieval control card comprising:
  - a list that includes said location for said schema control card; said
  - storage location; and
  - a row number of a row of said plurality of rows, and after said creating said storage control card or said creating said retrieval control card, traversing said plurality of tables utilizing said storage control card or traversing said plurality of table utilizing said retrieval control card, respectively;

said traversing said plurality of tables utilizing said retrieval control card comprising:
  converting and restoring a unique storage value located at said row having said row number in said storage location utilizing said schema control card and said retrieval control card, said converting and said restoring comprising:
    utilizing said plurality of primary keys, said plurality of foreign keys, and said plurality of datasets to traverse said plurality of tables according to said path;
    for each table field in each table of said plurality of tables, removing a second storage value from a beginning of said first storage value, said second storage value having a length equal to said data length associated with said table field, converting said second storage value from said first storage value data type to said data type associated with said table field, and storing said second storage value in each table.

12. The computer system of claim 11, each dataset in said plurality of datasets being a unique list comprising a table name, a list of table fields, a list of data types, and a list of data lengths, each data type in said list of data types being associated with a unique table field in said plurality of table fields, each data length being associated with a unique table field in said plurality of table fields.

13. The computer system of claim 11, said first storage value data type being a string.

14. The computer system of claim 11, said storage location being a database table consisting of a plurality of rows and a plurality of columns residing in a relational database environment.

15. The computer system of claim 11, said traversing said plurality of tables utilizing said storage control card comprising:
  converting and storing a second plurality of data values utilizing both said schema control card and said storage control card, said second plurality of data values being a subset of said first plurality of data values, said converting and said storing comprising: utilizing said plurality of primary keys, said plurality of foreign keys, and said plurality of datasets to traverse said plurality of tables according to said path; converting each data value relationally related to said data value into said first storage value; and storing said first storage value in said storage location according to said boolean value.

16. A process for supporting computer infrastructure, said process comprising providing at least one support service for at least one of creating, integrating, hosting, maintaining, and deploying computer-readable code in a computing system, wherein said code in combination with the computing system is capable of implementing 1 method for converting and storing data values comprising:
  receiving a plurality of primary keys and a plurality of foreign keys, each primary key in said plurality of primary keys being associated with a unique table of a plurality of tables, each foreign key in said plurality of foreign keys being associated at least two tables of said plurality of tables, each table in said plurality of tables being relationally related to at least one other table in said plurality of tables, wherein each table in said plurality of tables contains a first plurality of data values;
  receiving a plurality of datasets, each dataset in said plurality of datasets comprising a collection of schema for a unique table of said plurality of tables;
  after said receiving said plurality of primary keys and said plurality of foreign keys, after said receiving a plurality of datasets, creating a schema control card, said schema control card comprising a list that includes said plurality of primary keys, said plurality of foreign keys, a location for said plurality of datasets, and a list comprising a path to traverse said plurality of tables;
  after said creating said schema control card, creating a storage control card or creating a retrieval control card, said storage control card comprising:
    a list that includes a location for said schema control card;
    a data value located in at least one table of said plurality of tables, a storage location;
    a first storage value data type; and
    a boolean value identifying whether said first storage value replaces a previously stored first storage value located in said storage location, said retrieval control card comprising:
      a list that includes said location for said schema control card; said storage location; and a row number of a row of said plurality of rows, and
  after said creating said storage control card or said creating said retrieval control card, traversing said plurality of tables utilizing said storage control card or traversing said plurality of table utilizing said retrieval control card, respectively
  said traversing said plurality of tables utilizing said retrieval control card comprising:
    converting and restoring a unique storage value located at said row having said row number in said storage location utilizing said schema control card and said retrieval control card, said converting and said restoring comprising:
      utilizing said plurality of primary keys, said plurality of foreign keys, and said plurality of datasets to traverse said plurality of tables according to said path;
      for each table field in each table of said plurality of tables, removing a second storage value from a beginning of said first storage value, said second storage value having a length equal to said data length associated with said table field, converting said second storage value from said first storage value data type to said data type associated with said table field, and storing said second storage value in each table.

17. The process of claim 16, each dataset in said plurality of datasets being a unique list comprising a table name, a list of table fields, a list of data types, and a list of data lengths, each data type in said list of data types being associated with a unique table field in said plurality of table fields, each data length being associated with a unique table field in said plurality of table fields.

18. The process of claim 16, said first storage value data type being a string.

19. The process of claim 16, said storage location being a database table consisting of a plurality of rows and a plurality of columns residing in a relational database environment.

20. The process of claim 16, said traversing said plurality of tables utilizing said storage control card comprising:

converting and storing a second plurality of data values utilizing both said schema control card and said storage control card, said second plurality of data values being a subset of said first plurality of data values, said converting and said storing comprising: utilizing said plurality of primary keys, said plurality of foreign keys, and said plurality of datasets to traverse said plurality of tables according to said path; converting each data value relationally related to said data value into said first storage value; and storing said first storage value in said storage location according to said boolean value.

* * * * *